(12) United States Patent
Huskamp et al.

(10) Patent No.: US 7,623,940 B2
(45) Date of Patent: Nov. 24, 2009

(54) DIRECT-MANUFACTURED DUCT INTERCONNECTS

(75) Inventors: Chris Huskamp, St. Louis, MO (US); Tracy L. Bagwill, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 11/422,052

(22) Filed: Jun. 2, 2006

(65) Prior Publication Data

US 2007/0278794 A1    Dec. 6, 2007

(51) Int. Cl.
G06F 19/00 (2006.01)
G06F 17/50 (2006.01)
F16L 9/18 (2006.01)
F16L 21/02 (2006.01)
F16L 23/00 (2006.01)

(52) U.S. Cl. .................. 700/154; 700/98; 700/118; 700/163; 700/182; 703/1; 138/111; 138/113; 174/72 R; 174/98; 285/331; 285/363; 285/364

(58) Field of Classification Search ............. 700/97–98, 700/117–118, 154, 163, 182; 285/180, 197, 285/199, 331, 363, 364; 29/592; 439/100–102, 439/208, 799; 406/86, 191; 703/1; 138/111, 138/113; 174/72 R, 98

See application file for complete search history.

(56) References Cited

U.S. PATENT DOCUMENTS

| 4,558,892 | A | * | 12/1985 | Daw et al. ................ 285/331 |
| 5,466,020 | A | * | 11/1995 | Page et al. ................ 285/361 |
| 6,471,520 | B1 | | 10/2002 | Herman et al. |
| 7,007,980 | B2 | * | 3/2006 | Otsuga et al. ............. 285/197 |
| 7,097,804 | B2 | * | 8/2006 | Frantz et al. .............. 264/285 |
| 7,209,870 | B2 | * | 4/2007 | Simmons et al. ............ 703/1 |
| 2003/0034651 | A1 | * | 2/2003 | Neubauer et al. .......... 285/396 |
| 2004/0050487 | A1 | * | 3/2004 | Frantz et al. ............ 156/304.2 |
| 2004/0143954 | A1 | * | 7/2004 | Walsh ...................... 29/430 |
| 2005/0120715 | A1 | * | 6/2005 | Labrador ................... 60/618 |
| 2007/0219764 | A1 | * | 9/2007 | Backe et al. ................. 703/6 |
| 2007/0236018 | A1 | * | 10/2007 | Husmann et al. .......... 285/401 |

FOREIGN PATENT DOCUMENTS

EP   1760384 A2   3/2007
IT   1213690 B    12/1989

OTHER PUBLICATIONS

EPO Search Report for GB0710642.0, Aug. 3, 2007, The Boeing Company.

* cited by examiner

*Primary Examiner*—Ramesh B Patel
(74) *Attorney, Agent, or Firm*—Yee & Associates, P.C.; James M. Poole

(57) ABSTRACT

A method for forming a duct interconnect generally includes providing a digital model of a first duct structure and a second duct structure, the first duct structure including a first duct section having a passage for conveying a substance and an interconnect component moveably and captively coupled to the duct section. The second duct structure includes a second duct structure and a second interconnect component. The process includes forming, via a direct manufacturing procedure (e.g., stereolithography), a physical model of the first duct and second structures in accordance with the digital models, wherein the interconnect component has a locked and unlocked state, and wherein the unlocked state corresponds to a predetermined compressive force between the first duct structure and a second duct structure.

12 Claims, 4 Drawing Sheets

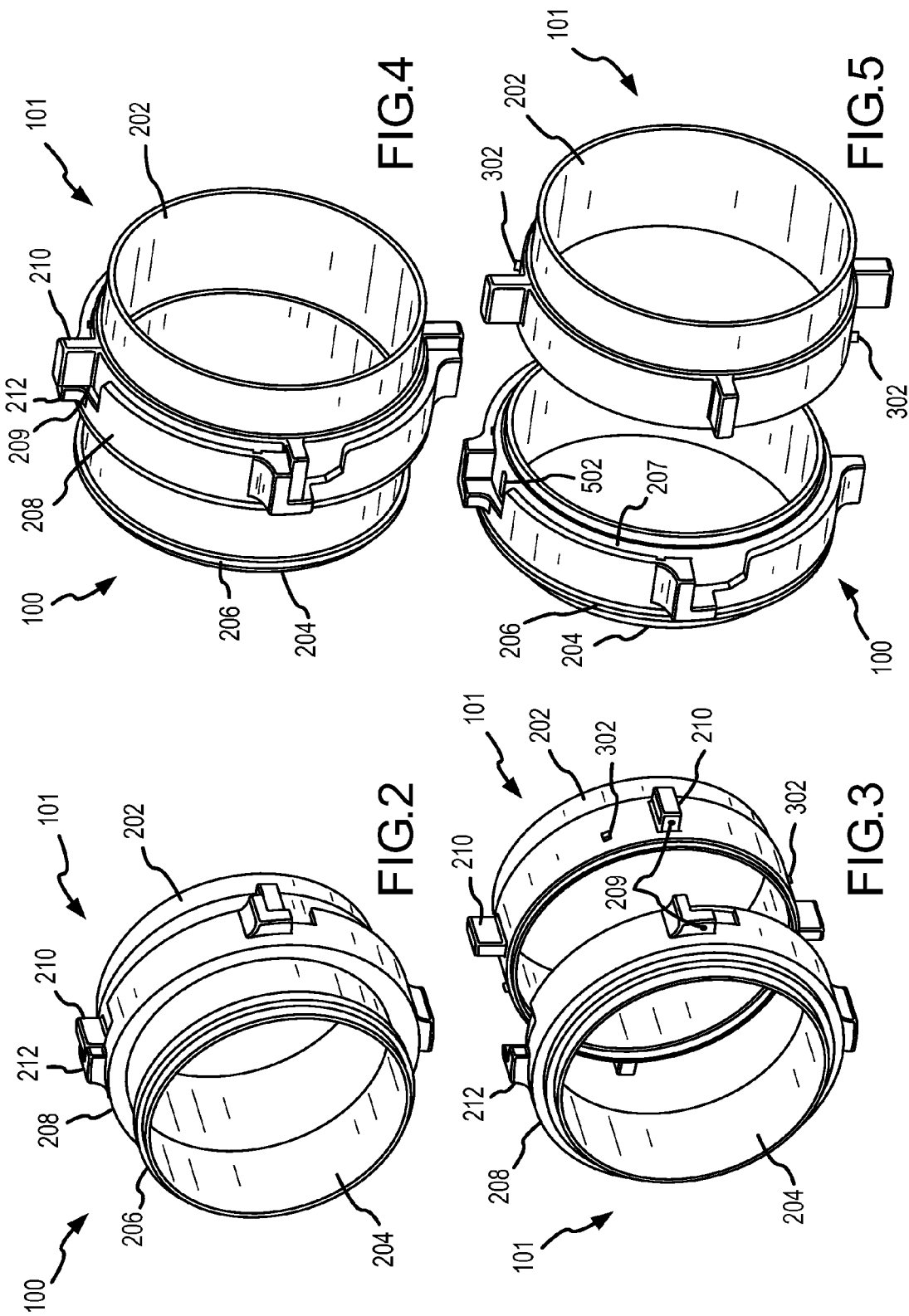

DIRECT-MANUFACTURED DUCT INTERCONNECTS

TECHNICAL FIELD

The present invention generally relates to duct systems and, more particularly, to duct system interconnects incorporating integral captive components.

BACKGROUND

Due to tight space requirements in aircraft and other vehicles, a substantial amount of time and energy is required to maintain parts buried under other subsystem and structures. Duct sections and the like are traditionally secured using worm clamps, Wiggins connectors, V-Band clamps and other such connection schemes. Actuation of these components requires a significant amount of space (i.e., a "clear volume" of surrounding space perpendicular to the duct surface) for a wrench, ratchet, or other specialized tool.

To address this issue, some duct interconnect schemes incorporate one or more captured components—i.e., locking components whose movement is limited or restrained by the duct itself. Such captured components are extremely expensive to manufacture in short production runs, and the high degree of detail required for a good lock is not obtainable through traditional lay-up or rotational molding processes. Similarly, injection molding, while sufficient for producing highly-detailed termination structures, is not capable of producing in-situ captured components.

Furthermore, known captured components are often configured as simple threaded collars that interface with a mating female threaded duct segment. While easy to actuate, such systems are undesirable in that the locking force between the interconnected duct segments is highly variable, and greatly depends upon the amount of torque applied during assembly. This variability is unsatisfactory in certain contexts, including military and aircraft applications.

Accordingly, there is a need for interconnect methods that provide advanced locking geometries with known locking force and improved clearance for actuation. Furthermore, other desirable features and characteristics of the present invention will become apparent from the subsequent detailed description and the appended claims, taken in conjunction with the accompanying drawings and the foregoing technical field and background.

BRIEF SUMMARY

In general, the present invention provides duct structures including one or more captive components formed via a direct manufacturing technique—e.g., selective laser sintering or the like. The invention may be embodied in one form by a method for forming a duct interconnect including: providing a digital model of a first duct structure, the first duct structure including a first duct section having a passage for conveying a substance, and an interconnect component moveably and captively coupled to the duct section; providing a digital model of a second duct structure having a second interconnect component; then forming, via a direct manufacturing procedure, a physical model of the first and second duct structures in accordance with respective digital models. In a locked state, a sealing force between the first and second duct structures is substantially equal to a predetermined value.

BRIEF DESCRIPTION OF THE DRAWINGS

The present invention will hereinafter be described in conjunction with the following drawing figures, wherein like numerals denote like elements.

FIGS. 2-4 depict various isometric views of an exemplary duct system; and

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should be appreciated that any processing steps described as being performed by a computer system, microprocessor, or software may in fact be realized by any number of hardware, software, and/or firmware components configured to perform the specified functions. For the sake of brevity, conventional techniques related to direct manufacturing, rapid prototyping, and computer modeling need not be described in detail herein.

In general, the present invention relates to a duct interconnect system fabricated using a direct-manufacturing process, such as selective laser sintering (SLS), wherein the interconnects include one or more captive components that are easy for a user to actuate and which have a predetermined sealing force when in a locked state.

Figure 1:
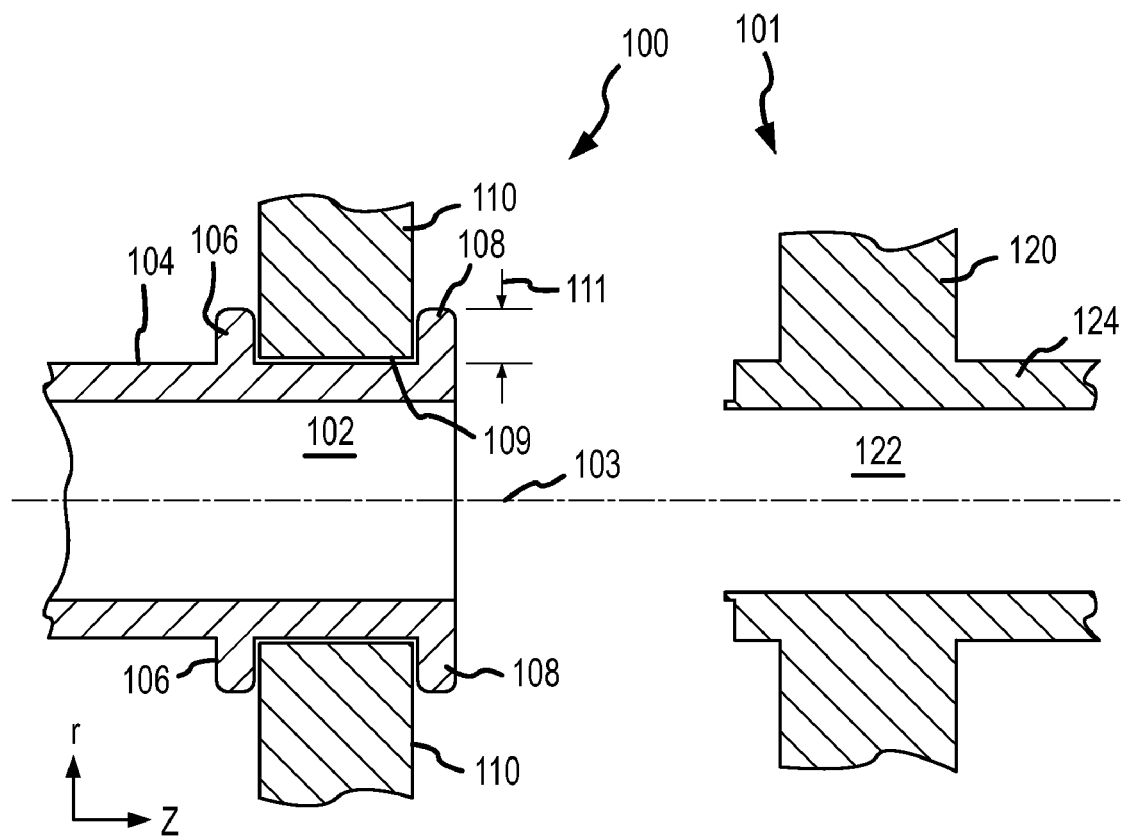
FIG. 1 is a conceptual cross-sectional view of a duct system in accordance with one embodiment of the invention.

Referring to the conceptual diagram shown in FIG. 1, a duct connection system in accordance with one embodiment generally includes two direct-manufactured duct structures configured to be removably interconnected—i.e., a duct structure 100 and a mating duct structure 101. Duct structure 100 includes a first duct section 104 having a passage 102 for conveying a substance (e.g., a water, gas, or solid, not shown), and an interconnect component 110 moveably and captivity coupled to duct section 104. Similarly, second duct structure 101 includes a second duct section 124 having a passage 122 and an interconnect component 120 (which may be fixedly or moveably attached to section 124) configured to enter a locked state when connected to interconnect component 110.

Interconnect component 110 is captively coupled to duct section 104 in that its relative movement is restricted—e.g., through a reduction in degrees of freedom and/or limitation in movement range. Such captively-coupled parts may be configured in a number of ways. In one embodiment, two collar stops (106, 108) are incorporated into duct section 104, and interconnect component 110 includes a collar (shown conceptually as component 110 itself) configured to seat between collar stops 106 and 108. In one embodiment, interconnect structure 110 is rotatably and translationally coupled to duct section 104 within a spatial range defined by collar stops 106 and 108.

A particular embodiment is depicted in FIGS. 2-5, where FIGS. 2 and 4 show front and back isometric views of a duct connection system in the locked position, and FIGS. 3 and 5 show front and back views of a duct connection system prior to connection. As shown (referring to FIG. 2), duct structure 100 includes a generally circular duct section 204 and an interconnect structure including a collar 208 that can rotate freely with respect to duct section 204. Collar 208 also translates along the duct within a range defined by a collar stop 206 and a second collar stop not visible in FIG. 2 (collar stop 207, shown in FIG. 5).

In the illustrated embodiment, each of the interconnect components also includes one or more ergonomic grips 212 and 210 that allow a human to easily rotate collar 208 while holding grips 210 in place. As shown, grips 210 rotate into place and are stopped by grips 212. A secondary locking mechanism is provided by fixing grips 212 to grips 210—for example, through the use of aligned through-holes 209 in the grips, in which a screw or other securing mechanism may be placed. Furthermore, in one embodiment, the first duct section includes a male alignment feature, and the second duct section includes a female alignment feature configured to receive the male alignment feature. Such a self-alignment feature assists in connecting the duct sections.

Duct structure 101 (referring to FIG. 3) includes a duct section 202 and an interconnect structure that includes one or more pins 302 on its outer diameter. The inner surface of collar 208 includes a slot and detent feature 502 that accepts pins 302, thereby effecting a locked condition. In the locked state, a sealing force between the first and second duct structures (104, 124) is substantially equal to a predetermined value. That is, unlike a simple threaded connection—which can exhibit a wide range of possible rotational positions and connection forces—the present invention incorporates a locking mechanism having a known sealing pressure and/or force.

Figure 6:
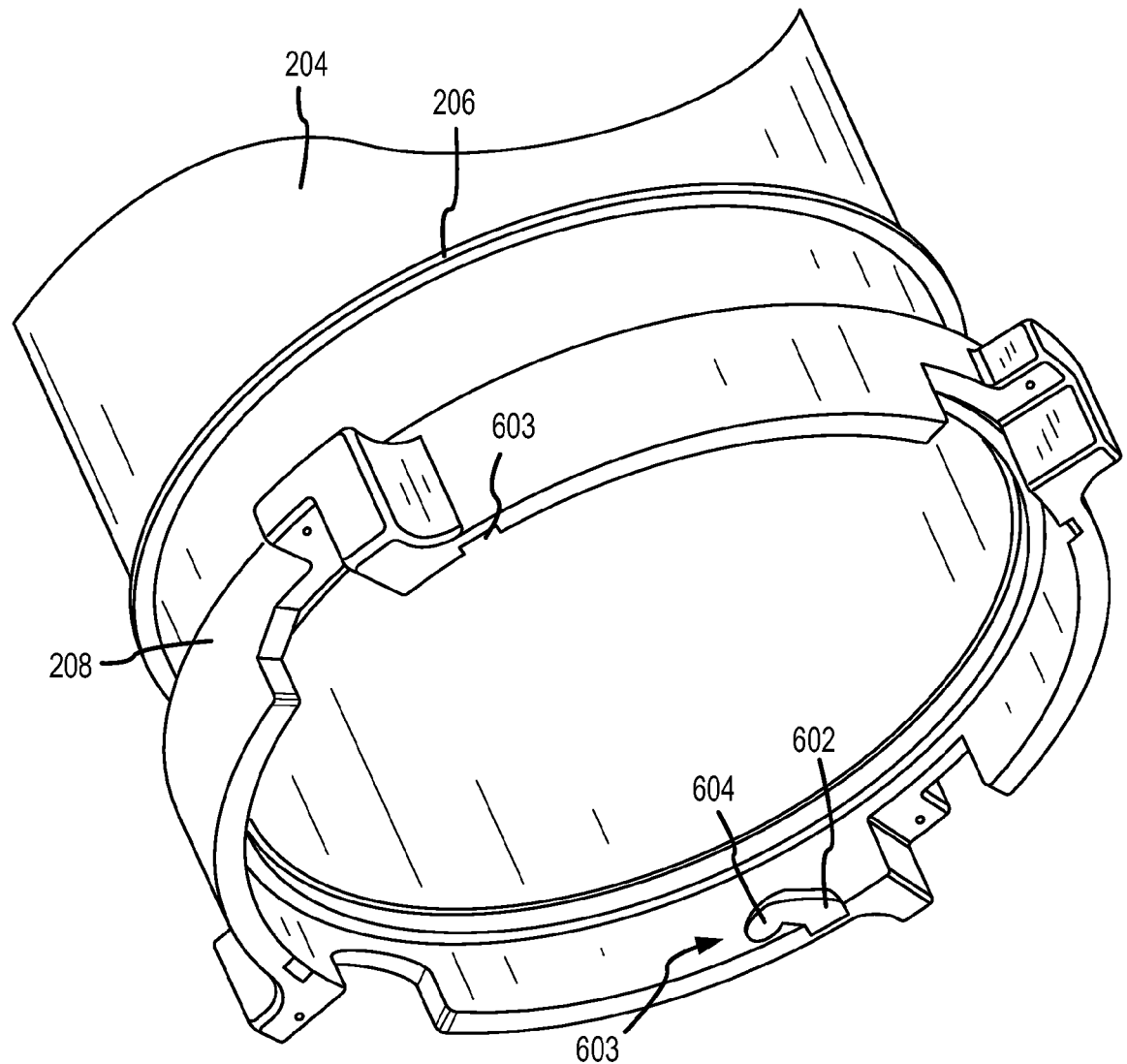
FIG. 6 shows an isometric overview of a duct structure in accordance with one embodiment.
Figure 8:
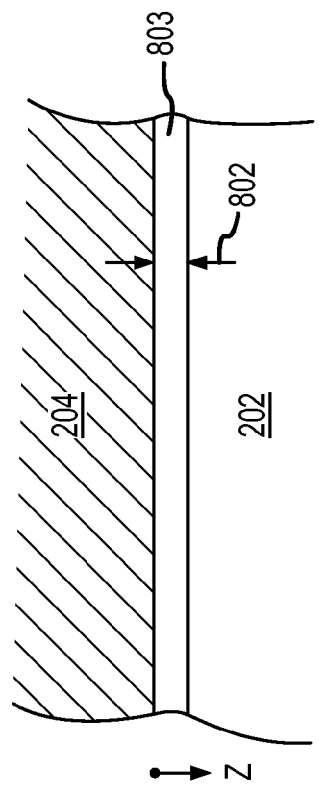
FIG. 8 depicts a locking force between mating interconnect structures.
Figure 7:
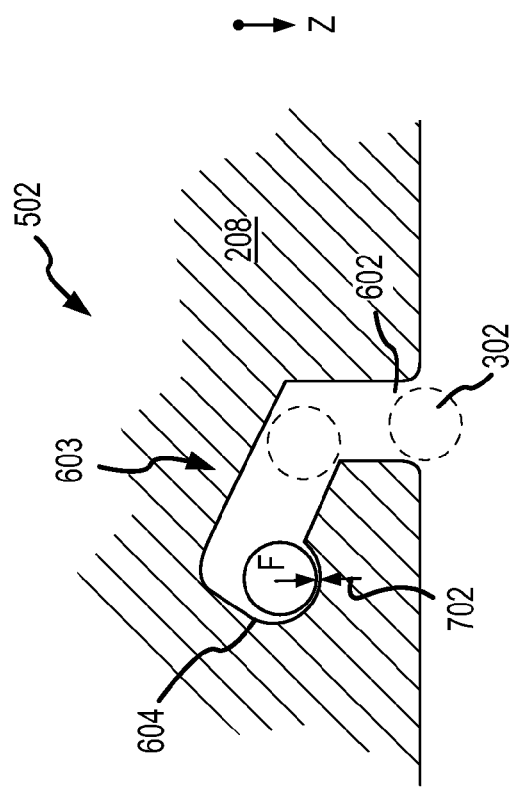
FIG. 7 shows an example locking mechanism in accordance with one embodiment.

Referring to FIG. 6, a locking feature 603 includes a slot 602 configured to accept external pin when collar 208 is moved parallel to the longitudinal axis of duct section 204. A detent 604 (e.g., a depression or other structure configured to accept a pin) is configured to accept the external pin when collar 208 is rotated and placed in the locked state. More particularly, referring to FIGS. 7 and 8, pin 302 enters slot 602 when the two interconnect structures are aligned, and then seats within detent region 604 when rotated to the locked position. It will be understood that any number of pins and corresponding pin slots may be incorporated into the inner surface of collar 208.

When in the locked state, a compressive force 702 results between pin 302 and collar 208. As collar 208 is mechanically coupled to duct section 204 (via a collar stop), a corresponding compressive force 802 occurs between duct sections 204 and 202 equal to the sum of all pin forces. In a preferred embodiment, a gasket, O-ring, or other such sealing layer is 803 provided between duct sections 204 and 202. Compressive force 702 (and 802) may be selected in accordance with applicable design standards. In one embodiment, for example, a number of pins are used, and the dimensions of locking feature 603 are selected such that the resultant force in a locked state is between approximately 40 and 50 N. It will be appreciated, however, that the invention is not so limited, and that the desired sealing force may be arrived at using standard mechanical engineering principles—e.g., finite-element modeling, closed-form structural analysis, and/or empirical testing.

In general, a method for fabricating the illustrated duct interconnect system includes: (1) creating or otherwise providing a digital model of the first duct structure; (2) providing a digital model of the second duct structure; and (3) forming, via a direct manufacturing procedure, physical models corresponding to the first duct structure and the second duct structure as specified by the digital models.

The digital models used to represent the various duct structures may be created using any suitable three-dimensional CAD system. Such systems and corresponding model data files are well known in the art. The components may be created as a single multi-component data file, or as individual data files.

With respect to the step of forming the physical models from the digital models, direct manufacturing generally refers to the direct creation of a scale model of a part or assembly using three-dimensional computer data. Direct-manufacturing techniques include, for example, stereolithography (SLA), selective laser sintering (SLS), laminated object manufacturing (LOM), fused deposition modeling (FDM), and solid ground curing (SGC).

In one embodiment, the various duct components are fabricated using SLS. In this method, a work area includes a supply of powder (e.g., a metal, plastic, or composite powder), which is supplied by one or more powder magazines. A laser and scanning mirror are used to trace out (and thermally fuse) thin layers corresponding to predefined layers of the computer model, while a platform within the work area moves downward (by the thickness of one layer), layer by layer, until the entire device is complete. This method has certain advantages when applied to captured collars, as the layer planes can be defined such that the longitudinal axis of the duct and interconnect component is normal to the layer planes. The powder then acts to support the growing layers of the collar, which is disconnected topologically from the duct (104, 124) itself. With standard SLA processes, which take place in a fluid, additional support structures would be required to hold the captured component in place during manufacturing.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for forming a duct connector, the method comprising:

providing a first digital model of a first duct structure, the first duct structure including a first duct section having a passage for conveying a substance, and a first interconnect component moveably and captively coupled to the duct section;

providing a second digital model of second duct structure, the second duct structure including a second duct section having a passage for conveying the substance, and a second interconnect component, wherein the second interconnect component is configured to removeably enter a locked state with the first interconnect component such that, when said second interconnect component is in the locked state, a sealing force between the first and second duct structures is substantially equal to a predetermined value;

forming, via a direct manufacturing procedure, a first physical model corresponding to the first duct structure defined by the first digital model; and forming, via the direct manufacturing procedure, a second physical model corresponding to the second duct structure defined by the second digital model.

2. The method of claim 1, further including forming a secondary locking mechanism on said first interconnect component.

3. The method of claim 1, wherein the physical model is formed from a material selected from the group consisting of plastics, metals, ceramics, and composites.

4. The method of claim 1, wherein the direct manufacturing procedure is a layering method.

5. The method of claim 4, wherein the layering method is a method selected from the group consisting of stereolithography, selective sintering, metal additive processing, and laminated object manufacturing.

6. The method of claim 1, wherein the first interconnect component is captively coupled to the first duct section such that said first interconnect component exhibits two degrees of freedom with respect to the duct section.

7. The method of claim 6, wherein the two degrees of freedom correspond to a sliding degree of freedom parallel to a longitudinal axis of the duct section; and a rotational degree of freedom about the longitudinal axis of the duct section.

8. The method of claim 1, wherein the first duct section has a circular cross-section.

9. The method of claim 1, wherein:
the second interconnect component includes at least one external pin; and
the first interconnect component includes:
a slot configured to accept the external pin when the first interconnect component is moved parallel to the longitudinal axis; and
a detent configured to accept the external pin when the first interconnect component is subsequently rotated about the longitudinal axis to enter the locked state.

10. The method of claim 1, wherein the first interconnect component is captively coupled to the first duct section via at least one collar stop integral to the first duct section, and wherein the first interconnect component includes a collar configured to seat adjacent the collar stop.

11. The method of claim 1, wherein the first duct section includes a male alignment feature and the second duct section is configured to receive the male alignment feature.

12. The method of claim 1, wherein the first interconnect structure and the second interconnect structure each include at least one grip structure.

* * * * *

UNITED STATES PATENT AND TRADEMARK OFFICE
CERTIFICATE OF CORRECTION

PATENT NO. : 7,623,940 B2  Page 1 of 1
APPLICATION NO. : 11/422052
DATED : November 24, 2009
INVENTOR(S) : Huskamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this

Twenty-sixth Day of October, 2010

David J. Kappos
*Director of the United States Patent and Trademark Office*